US006957452B2

(12) United States Patent
Grant

(10) Patent No.: US 6,957,452 B2
(45) Date of Patent: Oct. 25, 2005

(54) OPTICAL COUPLER FOR USE WITH LIGHT-TRANSMISSIVE ABOVE-COUNTER SINKS

(75) Inventor: Rick Grant, Brush Prairie, WA (US)

(73) Assignee: O'Ryan Industries, Inc., Vancouver, WA (US)

(*) Notice: Subject to any disclaimer, the term of this patent is extended or adjusted under 35 U.S.C. 154(b) by 0 days.

(21) Appl. No.: 11/078,882

(22) Filed: Mar. 9, 2005

(65) Prior Publication Data

US 2005/0158012 A1 Jul. 21, 2005

Related U.S. Application Data

(62) Division of application No. 10/441,645, filed on May 19, 2003, now Pat. No. 6,886,958.

(51) Int. Cl.[7] ............................ E03C 1/18; E03C 1/33; G02B 6/26

(52) U.S. Cl. ....................... 4/638; 4/619; 4/643; 4/650; 385/147; 385/39; 362/559; 362/581

(58) Field of Search ........ 385/38–39; 4/619–653; 362/551–582

(56) References Cited

U.S. PATENT DOCUMENTS

| | | | |
|---|---|---|---|
| 2,704,556 A | 3/1955 | Blish | |
| 4,535,489 A | 8/1985 | Elkins | |
| 4,826,273 A | 5/1989 | Tinder et al. | |
| 4,875,958 A | 10/1989 | Kurokawa | |
| 4,901,922 A | 2/1990 | Kessener et al. | |
| 5,207,499 A | 5/1993 | Vajda et al. | |
| 5,253,376 A | 10/1993 | Fait | |
| 5,764,845 A | 6/1998 | Nagatani et al. | |
| 6,269,491 B2 | 8/2001 | Zankow | |
| D455,476 S | 4/2002 | Ferrer Beltran | |
| 6,393,192 B1 | 5/2002 | Koren | |
| 6,488,393 B1 | 12/2002 | Burnham | |
| 6,502,976 B1 | 1/2003 | Bernhard | |
| 6,781,329 B2 * | 8/2004 | Mueller et al. | 315/297 |
| 6,802,635 B2 | 10/2004 | Robertson et al. | |
| 6,877,171 B2 * | 4/2005 | Shimizu | 4/541.5 |

* cited by examiner

*Primary Examiner*—Rodney Bovemick
*Assistant Examiner*—Jerry T. Rahll
(74) *Attorney, Agent, or Firm*—Marger Johnson & McCollom, P.C.

(57) ABSTRACT

An optical coupler for use within a sink assembly comprising a countertop having a countertop bore formed therethrough and a sink basin mounted above the countertop, the basin having a bore co-axial with the countertop bore for receiving the terminal end of a water drain pipe passing up through the countertop to the sink basin. The light coupler includes a light coupler body having a lower portion received through the countertop bore and an upper portion resting on the countertop about the countertop bore. The water drain pipes passes up through a bore formed through the light coupler body, the coupler further having a light-transmissive portion coupling the lower portion with the upper portion. Light from a light source located proximal the lower surface of the light coupler body lower portion is admitted through the lower surface and transmitted up through the light coupler body and out the upper surface to the sink basin.

9 Claims, 6 Drawing Sheets

OPTICAL COUPLER FOR USE WITH LIGHT-TRANSMISSIVE ABOVE-COUNTER SINKS

CROSS-REFERENCE TO RELATED APPLICATIONS

This application is a divisional of U.S. patent application Ser. No. 10/441,645, filed on May 19, 2003, now U.S. Pat. No. 6,886,958, whose contents are incorporated herein for all purposes.

BACKGROUND OF THE INVENTION

This invention relates generally to lighting mechanisms for transparent thermoplastic acrylic resin and glass sinks and countertops and more particularly to such a mechanism that couples a below counter light with an above counter sink.

Whereas traditional bathroom fixtures such as sinks and tubs have been made of opaque materials such as porcelain, modern developments have seen the introduction of translucent or even transparent materials into today's bathrooms. Transparent acrylic materials, such as those marketed under the Lucite trademark, are gaining in popularity. Fused glass is also another material that is increasingly being used within fixtures. The acrylic or glass materials within the fixture is known to act as a light guide so that light introduced into one portion of the fixture is diffused throughout the fixture to give the fixture a glow. The problem, then, is where to place the light for maximum effect since it is desired that the light source be hidden to generate the illusion that the fixture is glowing on its own. This becomes increasing difficult in modern sinks where the sink bowl is located on top of the countertop.

Accordingly, a solution to lighting above-counter transparent or translucent sinks is desired.

SUMMARY OF THE INVENTION

The current invention is used to couple a light source such as a light emitting diode (LED) to a clear acrylic or glass sink so that the sink lights up with a soft color-controlled glow when the LED is switched on. The type of sink contemplated for use with the present invention is the newer type found in many designer homes where the sink bowl bottom rests on the bottom of the countertop and the edges curve upward from the counter surface. This is in contrast to conventional sinks where the countertop has a hole cut into it and the sink bowl is lowered through the hole so that the upper edges of the sink bowl rest on the countertop and the drain hole at the bottom of the sink is below the level of the counter.

The invention comprises a light coupler of a type used to transmit light from a light source located below a countertop to a light-transmissive object such as a sink located above the countertop. Both the countertop and sink have a co-axial bore formed therethrough arranged to receive a drain pipe through the counter and up into the bottom of the sink basin. The light coupler includes a light coupler body having an upper portion and a lower portion with the upper portion having a larger dimension than that of the co-axial bore and the lower portion have a smaller dimension than that of the co-axial bore. The lower portion is received through the co-axial bore. The upper portion has a resting surface adapted to contact the countertop and support the light coupler body within the co-axial bore. The upper portion further includes an upper light transmissive surface adapted to contact a light transmissive surface of the sink. The lower portion has a lower light transmissive surface whereby light admitted through the lower light transmissive surface is communicated to the upper light transmissive surface and thence to the sink. The light coupler body includes a bore formed through the light coupler body from the lower light-transmissive surface to the upper light-transmissive surface where the bore is adapted to receive a drain pipe passing from below the countertop to the sink.

The foregoing and other objects, features and advantages of the invention will become more readily apparent from the following detailed description of a preferred embodiment of the invention that proceeds with reference to the accompanying drawings.

DETAILED DESCRIPTION

Figure 1:
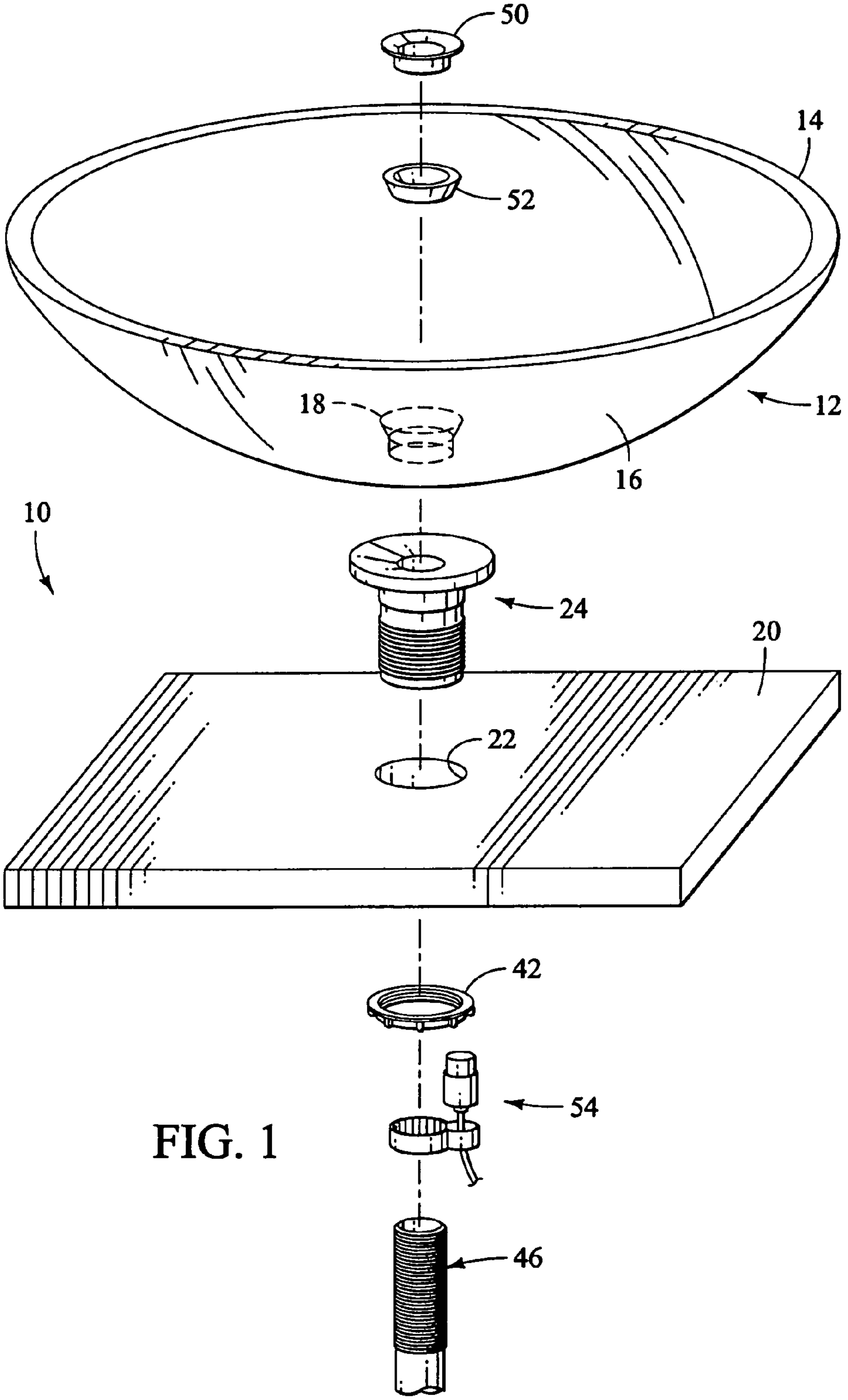
FIG. 1 is an exploded perspective view of a preferred embodiment of the invention assembled within a sink countertop and above-counter sink basin.

FIG. 1 illustrates an exploded view of a light coupler constructed and installed within a sink assembly 10 per a preferred embodiment of the invention. The sink assembly includes a sink basin 12 having an upper peripheral rim 14 and curved sloping sides 16 ending in a bore 18 formed through a lower end of the basin. The basin 12 is formed of any material that is capable of transmitting or passing light through at least part of the basin. Examples include acrylic, glass, or any other translucent material.

The sink assembly 10 further includes a countertop 20 having a bore 22 formed therethrough. In the full assembly shown in FIG. 1, countertop bore 22 is aligned with bore 18 in the sink basin to form a co-axial alignment. The countertop material is typically opaque so that light from beneath the countertop cannot pass through the countertop surface to above the countertop except through bore 22. An optical light coupler 24 is fitted through bore 22 and supports the sink basin 12 as will be explained further below.

FIGS. 5A–5D illustrate the light coupler 24 constructed according to a preferred embodiment of the invention, showing perspective, side (partial section) elevation, top and bottom views, respectively. Light coupler 24 includes an upper portion 26 and a lower portion 28 forming a unitary body preferably formed of a transparent material selected from the group consisting of acrylic, glass, or acrylonitrile butadiene styrene (ABS) plastic.

Figure 2:
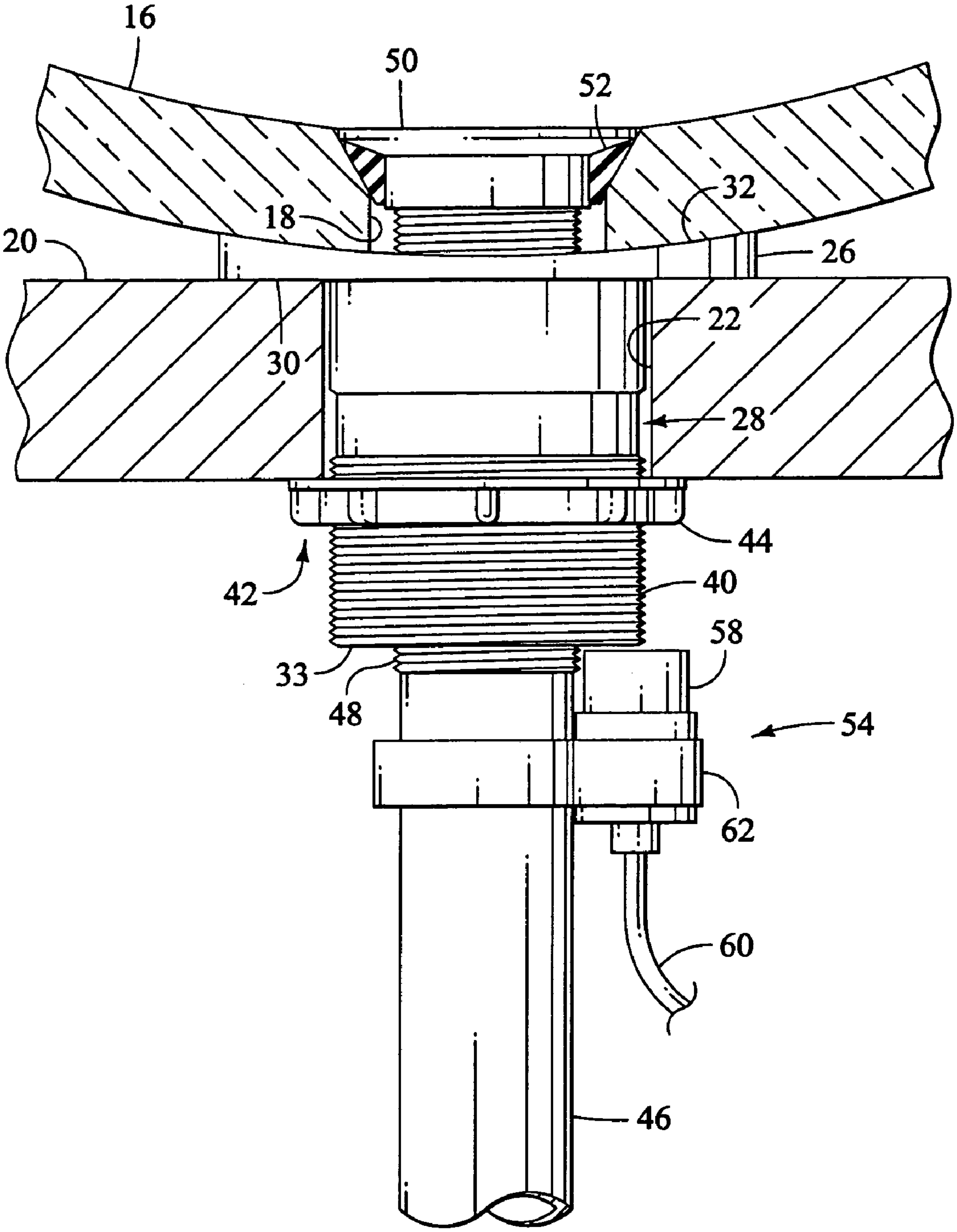
FIG. 2 is a side elevation view of the assembly of FIG. 1.

Turning also to FIG. 2, the upper portion 26 of coupler 24 has a larger dimension, e.g. diameter, than lower portion 28 which itself is dimensioned to allow it to be inserted within countertop bore 22. The upper portion has a resting surface 30 adapted to contact the countertop 20 and support the light coupler body within the co-axial bore 22. The upper portion 26 further includes an upper light transmissive surface 32 adapted to contact a light transmissive surface 16 of the sink basin 12. Upper surface 32 is shaped to substantially conform to the lower surface of the sink basin 12; that is, the light coupler body upper portion has a concave shape of an approximate curvature to that of the bottom surface of the sink basin 12 immediately adjacent the drain hole 18.

The lower portion 28 of the light coupler 24 has a lower light transmissive surface 33 whereby light admitted through the lower light transmissive surface is communicated to the upper light transmissive surface 32 and thence to the sink basin 12. It is preferred that both upper 32 and lower 33 light transmissive surfaces be highly polished. One method contemplated for polishing is to use a cloth and jeweler's polish and hand wiping the surface to be polished. The complementary surface on the sink is also treated in this fashion to enact a polished surface on it for minimal light loss along the interface between the coupler 24 and sink basin 12. The light coupler body includes a bore formed through the body from the lower light-transmissive surface 33 to the upper light-transmissive surface 32 where the bore is adapted to receive a drain pipe passing from below the countertop to the sink. In the partial side sectioned view of FIG. 5B, bore 34 is formed in upper portion 26 while a second, co-axial bore, 36 is formed in lower portion 28. The bores 34, 36 are shown having different diameters; however it is understood within the context of this embodiment that such is not necessary, but that both effectively constitute a single bore passing through a center of axis 38 of the coupler 24. The bore diameters can be chosen to preferably minimize the amount of material used to form the coupler 24 while still giving the sidewalls of the coupler enough strength to support the sink basin.

Threads 40 are formed on an outside surface of the lower portion 28. A nut 42 (FIG. 2), with an outside diameter 44 larger than countertop bore 22 is screwed onto the threads 40 of the lower portion 28 until the nut contacts the underside 46 of countertop 20 about countertop bore 22 and firmly holds the light coupler body within the countertop bore 22.

As shown in the assembly in FIG. 2, the lower portion 28 is received completely through bore 22 formed in the sink countertop 20. The upper portion 26 has a greater diameter than the lower portion 28 so that the lower surface 30 of the upper portion can rest on the sink countertop when the coupler 24 is installed through the countertop bore 22. The distal end of the lower portion 28 of the coupler, the portion that emerges from out the bottom of the bore, is threaded 40 so that a nut 42 can be screwed thereon to affix the coupler to the countertop. The upper surface of the upper portion has a concave shape to closely accommodate the convex shape of the lower portion of the sink basin 12 when the sink is installed on top of the coupler 24. The upper surface is preferably polished as maximal contact and polished surfaces are most efficient at transmitting light between objects (e.g. the coupler and the sink) in contact with one another. It is also preferred that a lower surface of the lower portion be polished to maximally transmit light from the LED up through the coupler and into the sink as will be explained further below.

The coupler 24 includes a bore formed through the center axis 38. A water drain pipe 46 is received up through the bore 34 in the light coupler body and includes a threaded terminal end 48 extending out an upper end of the countertop bore 22 into the sink basin bore 18. A drain 50 and rubber gasket 52 are installed from within the sink basin and screwed onto the threaded end 48 of the pipe 46. The rubber gasket 52, formed about the drain, prevents water from dripping outside the pipe 46 onto the countertop 20 or into the space below the countertop.

The sink assembly 10 further includes a light source 54 located proximally to the lower surface 33 of the coupler 24 so that light admitted through the lower surface is transmitted up through the light coupler body and out the upper surface 32 to the sink basin 12. This is realized in a preferred embodiment by use of a light emitting diode (LED) or array of such diodes.

FIG. 2 illustrates the invention using a first embodiment of the light source 54. The LED light 58 is mounted to the drain pipe in such a way as to direct the light from the LED to the bottom surface 33 of the coupler lower portion 28. LED 58 is attached to an electrical source by wire 60 and is received within a clip 62 which then attaches the LED 58 to drain pipe 46. The light is then transmitted through the coupler 24 and up into the sink walls 16 where the light is dispersed to present a gently glowing object. The LED light 58 can of course be controlled so that the color of the light projected, and the intensity of the light, shifts according to principals well known in the art and not discussed here.

Figure 3:
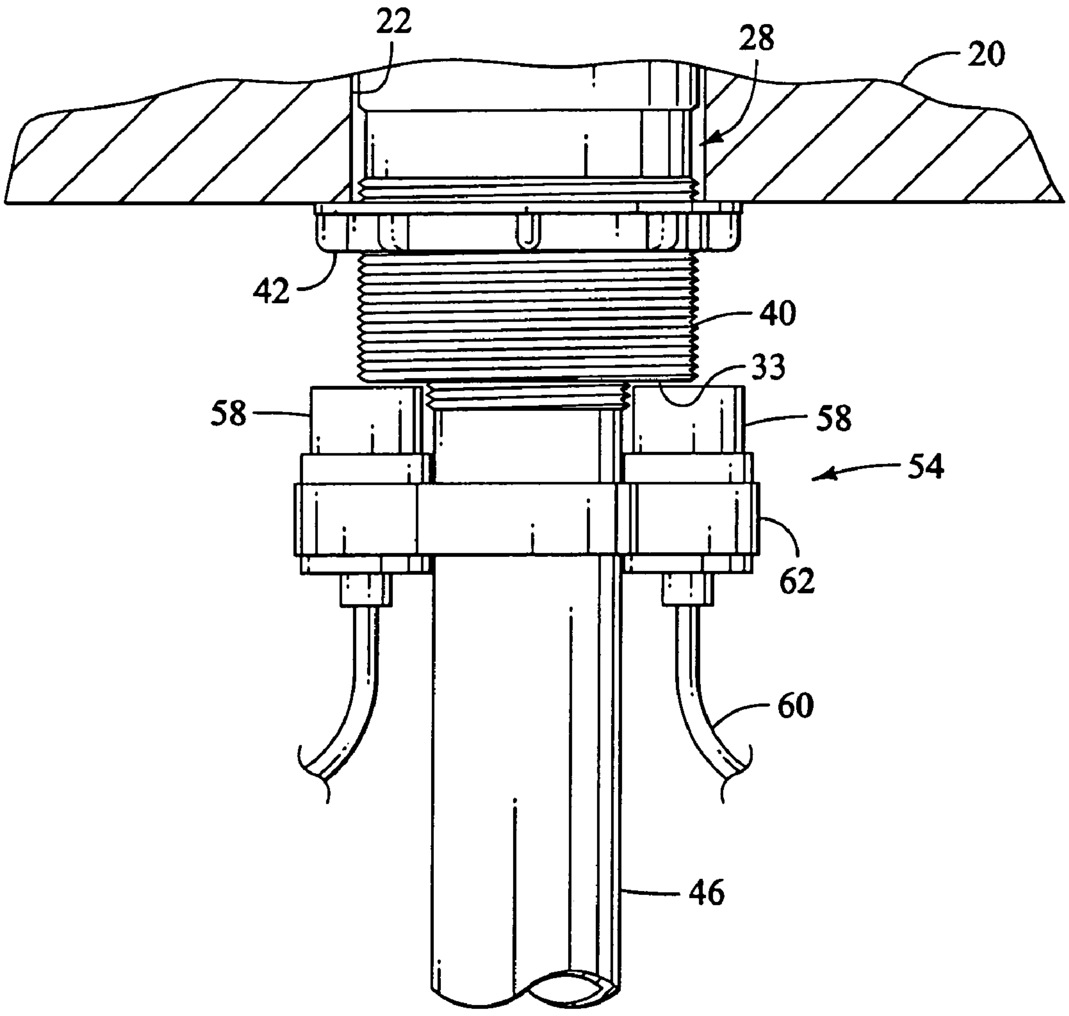
FIG. 3 is a side elevation view of a first alternate embodiment of the invention.

FIG. 3 illustrates the invention using a second embodiment of the light source 54. The light source 54 in the second embodiment includes a pair of LEDs 58 mounted immediately below the lower surface 33 of the light coupler body lower portion 28. Each of the pair of lights 58 are spaced on opposing sides of the drain pipe. 46. The LED lights 58 are mounted to the drain pipe in such a way as to direct the light from the LED to the bottom surface 33 of the coupler lower portion 28. LEDs 58 are attached to an electrical source by wire 60 and are received within a clip 62 which then attaches the LEDs 58 to drain pipe 46. The light is then transmitted through the coupler 24 and up into the sink walls 16 as before.

Figure 4A:
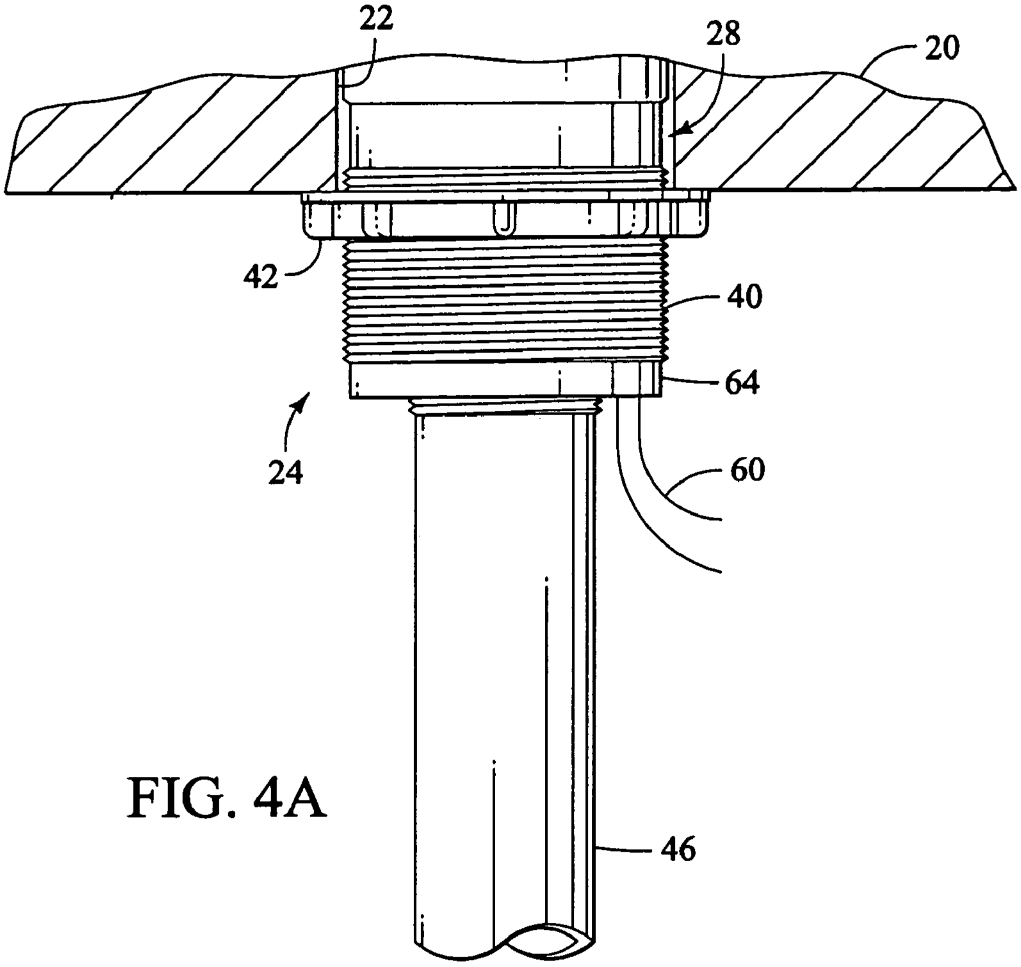
FIG. 4A is a side elevation view of a second alternate embodiment of the invention.
Figure 4B:
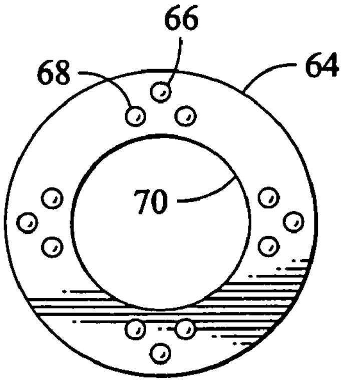
FIG. 4B is a top plan view of the lighting device used within the FIG. 4A assembly.
Figure 5A:
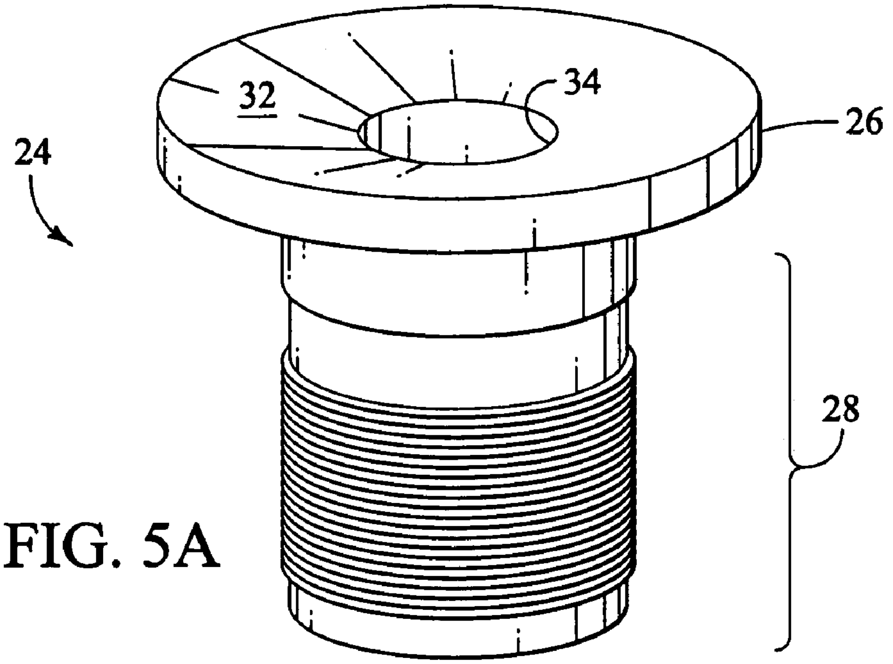
FIGS. 5A–5D are perspective, partial section side elevation, top plan, and bottom plan views of the light coupler device used in the embodiments shown in FIGS. 1–4.
Figure 5B:
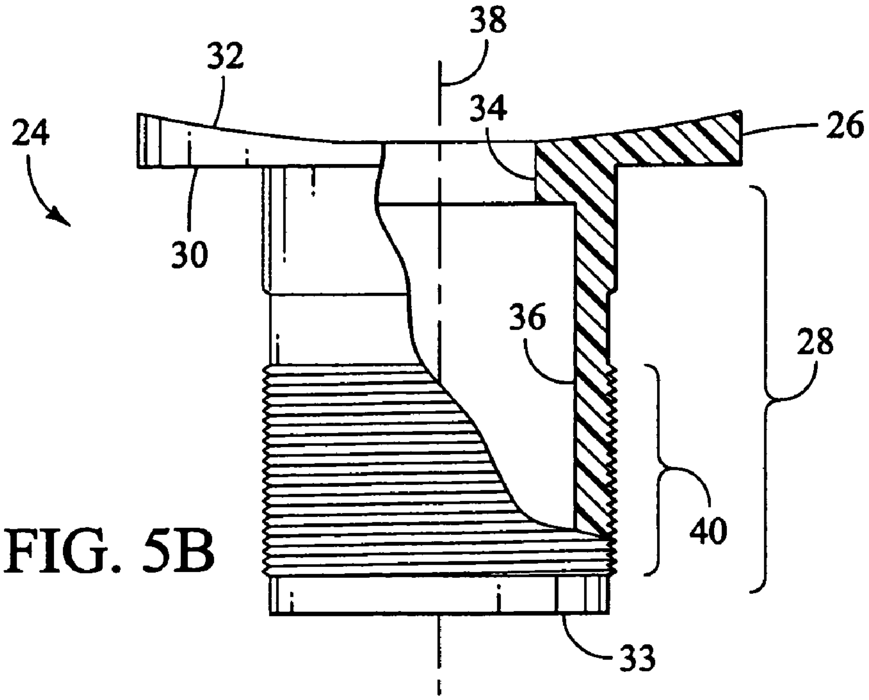
Figure 5C:
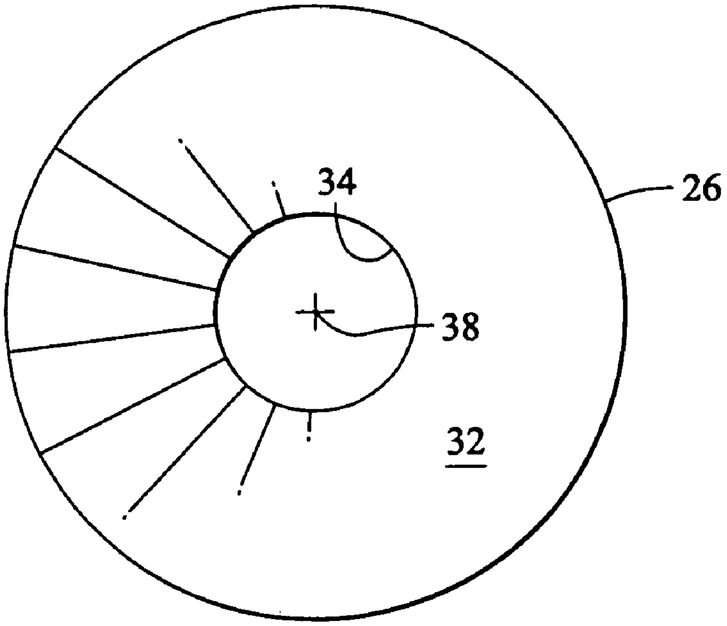
Figure 5D:
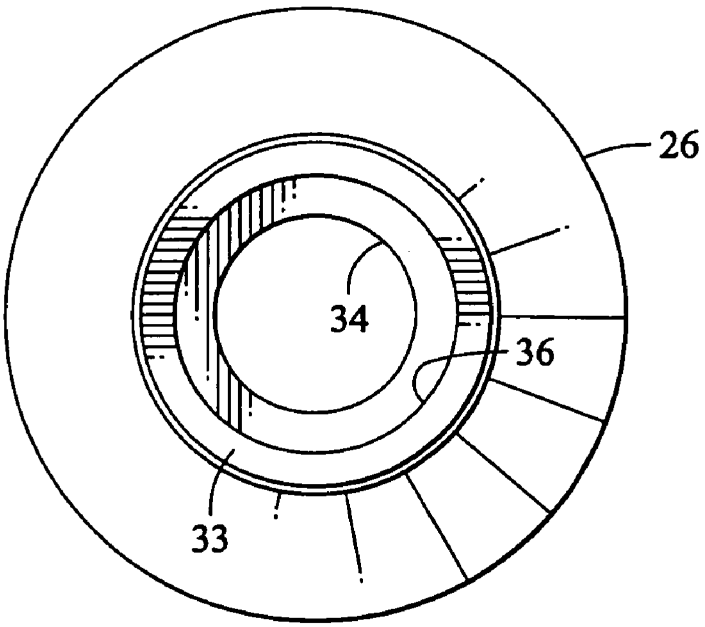

FIGS. 4A and 4B illustrate the invention using a third embodiment of the light source 54. The light source 54 in the second embodiment includes a ring 64 of spaced LEDs, such as LEDs 66, 68, mounted immediately below and in registry with the lower surface 33 of the light coupler body lower portion 28. The LED lights are mounted to the drain pipe in such a way as to direct the light from the LEDs to the bottom surface 33 of the coupler lower portion 28. LED ring 64 is attached to an electrical source by wire 60 includes a central cutout 70 through which the drain pipe 46 is received. The light is then transmitted through the coupler 24 and up into the sink walls 16 as detailed earlier.

Having described and illustrated the principles of the invention in preferred embodiments thereof, it should be apparent that the invention can be modified in arrangement and detail without departing from such principles. I claim all modifications and variation coming within the spirit and scope of the following claims.

I claim:

1. A sink assembly comprising:

a countertop having a countertop bore formed therethrough;

a light coupler body having a lower portion received through the countertop bore and an upper portion resting on the countertop about the countertop bore, the light coupler body having a bore formed therethrough and a light-transmissive portion coupling the lower portion with the upper portion;

a water drain pipe received up through the bore in the light coupler body having a terminal end extending out an upper end of the bore; and a sink bowl having a bore receiving the terminal end of the water drain pipe so that a bottom surface of the sink bowl rests on an upper surface of the upper portion of the light coupler body.

2. The sink assembly of claim 1, wherein the upper surface of the light coupler body upper portion has a concave shape of an approximate curvature to that of the bottom surface of the sink bowl.

3. The sink assembly of claim 1, further including a light source proximal the lower surface of the light coupler body lower portion so that light admitted through the lower surface is transmitted up through the light coupler body and out the upper surface to the sink bowl.

4. The sink assembly of claim 3, wherein the upper surface of the light coupler body upper portion is polished.

5. The sink assembly of claim 3, wherein the lower surface of the light coupler body lower portion is polished.

6. The sink assembly of claim 3, wherein said light source includes an LED mounted on the drain pipe immediately below the lower surface of the light coupler body lower portion.

7. The sink assembly of claim 3, wherein said light source includes a pair of LEDs mounted on the drain pipe immediately below the lower surface of the light coupler body lower portion, with each of the pair spaced on opposing sides of the drain pipe.

8. The sink assembly of claim 3, wherein said light source includes a ring of lights in registry with the lower surface of the light coupler body lower portion.

9. The sink assembly of claim 1, further including threads formed on an outside surface of the lower portion and a nut with an outside diameter larger than the countertop bore screwed onto the threads of the lower portion until the nut contacts an underside of the countertop about the countertop bore and firmly holds the light coupler body within the countertop bore.

* * * * *